United States Patent [19]
Basile et al.

[11] Patent Number: 5,279,740
[45] Date of Patent: Jan. 18, 1994

[54] GROUND CONTAMINATION REMEDIATION PROCESS

[75] Inventors: Angelo J. Basile, Union, N.J.; Gregory J. Smith, Westmont; Joseph W. Aiken, Western Springs, both of Ill.

[73] Assignee: AT&T Bell Laboratories, Murray Hill, N.J.

[21] Appl. No.: 820,577

[22] Filed: Jan. 14, 1992

[51] Int. Cl.⁵ ............................................ C02F 3/00
[52] U.S. Cl. ................................ 210/610; 166/246; 210/747
[58] Field of Search ....................... 166/245, 246, 311; 210/610, 611, 747, 170, 901; 405/128, 129

[56] References Cited

U.S. PATENT DOCUMENTS

| | | | |
|---|---|---|---|
| 4,435,292 | 3/1984 | Kirk et al. | 210/747 |
| 4,593,760 | 6/1986 | Visser et al. | 166/267 |
| 4,600,508 | 7/1986 | De Ghetto | 210/170 |
| 4,660,639 | 4/1987 | Visser et al. | 166/267 |
| 4,730,672 | 3/1988 | Payne | 166/266 |
| 4,765,902 | 8/1988 | Ely et al. | 210/610 |
| 4,848,460 | 7/1989 | Johnson et al. | 166/245 |
| 4,992,174 | 2/1991 | Caplan et al. | 210/170 |
| 5,018,576 | 5/1991 | Udell | 166/272 |

*Primary Examiner*—Ivars Cintins
*Attorney, Agent, or Firm*—Oleg E. Alber

[57] ABSTRACT

Disclosed is a process for improved removal of contaminants including oily wastes and other organic hydrocarbonaceous materials from ground waters and areas adjacent to or in the vicinity of ground water locations. Ground and ground water contamination due to its unique nature, as being below ground and often not readily removable, has presented unique challenges to efforts seeking to render contaminated sites safe for habitation and/or contain and prevent contaminants to other, non-contaminated areas. The present process presents a viable solution to the problem of removing hydrocarbonaceous contaminating materials from ground and ground water. The process includes the use of at least two injection wells and at least one extraction well. One of the injection wells is being used for introduction of steam into a subsurface saturated zone. The other of the injection wells is being used for introduction, simultaneously with introduction of steam, of nutrients effective to enhance the growth of naturally occurring hydrocarbon degrading biota present in the subsurface area and/or of non-naturally occurring hydrocarbon degrading biota and nutrients effective to enhance the growth thereof. Upon application of a withdrawing force to the extraction well(s) at least a portion of the contaminants in the subsurface saturated zone is caused to be displaced toward the extraction well, in liquid or vaporized form or in combination thereof. These contaminants are then withdrawn through and removed from the contaminated area by the extraction well(s).

15 Claims, 4 Drawing Sheets

FIG. 3
FIG. 4
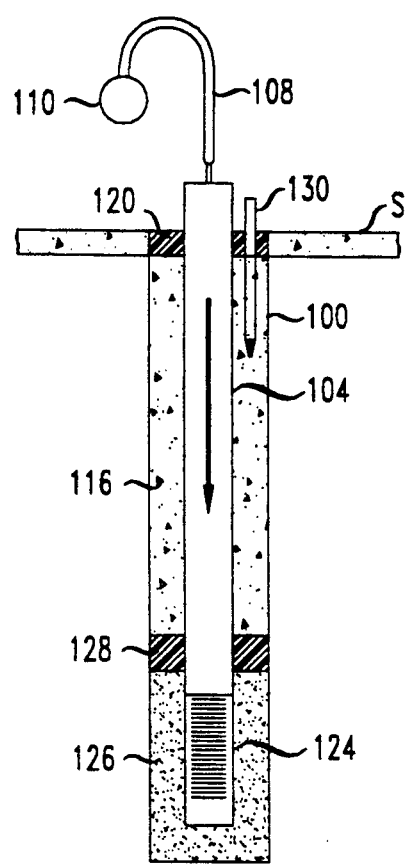
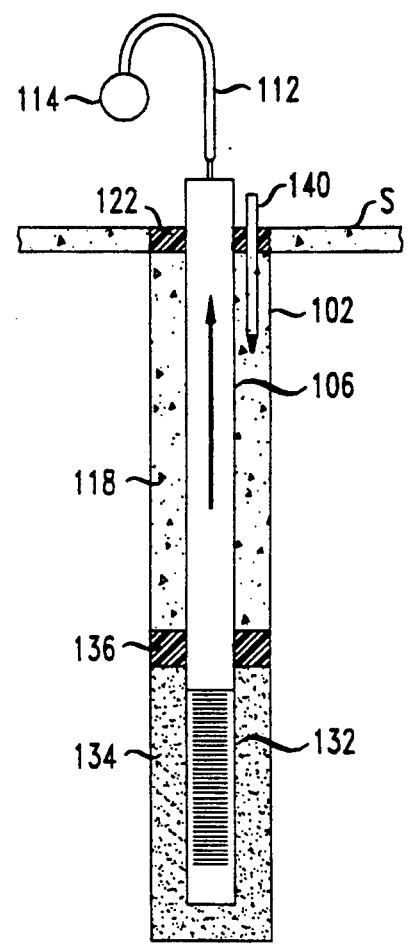

▲ EXTRACTION WELL POINT
■ NUTRIENT DELIVERY WELL
● STEAM DELIVERY WELL

1

GROUND CONTAMINATION REMEDIATION PROCESS

FIELD OF THE INVENTION

The present inventive process and apparatus therefor relates to remediation of contaminants including oily wastes and other organic hydrocarbonaceous materials from ground water and areas adjacent to on in the near vicinity of ground water locations.

BACKGROUND OF THE INVENTION

The remediation of ground and groundwater contamination has become an important issue in recent years, and due to its unique nature as being well below ground level and in many cases not readily removable has thus also presented unique challenges to efforts seeking to render contaminated sites safe for habitation, and/or to contain and prevent migration of contaminants to non-contaminated areas.

One example of ground contamination remediation is discussed in U.S. Pat. No. 4,435,292. In this method, perforated pipes and wells are inserted into the ground of a contamination site, wherein a number of the pipes and wells are pressurized and others are simultaneously evacuated to effect the transfer of flushing fluid through the soil to accelerate the removal of contaminants, and to prevent migration of the contaminants into other areas. The system is closed and pressurized at one end and evacuated at another end, for example, by evacuating ducts connected to a central manifold. Flushing fluid is then forced under pressure through the perforated pipes to be forced into contaminated earth to flush out any contaminants situated therein. The flushing fluid may be either liquid or gaseous, e.g. an inert gas such as nitrogen, or a reactive gas system which would react with the contaminant to form an inert or harmless chemical. This process, however, suffers from the need for costly inert flushing fluids and/or gases, or the danger of further polluting contaminated soil with non-reacted flushing solvent.

Another attempt at soil decontamination is described in U.S. Pat. No. 4,600,508, which is said to be an improvement over the method discussed above. In this method, a plurality of perforated pipes are connected to a supply header for distributing water under the force of a pump throughout a contaminated area. An additional set of perforated pipes which are connected to a return header withdraw the water circulated under pressure which contains contaminants from the ground. The contaminants are thereafter removed from the water, and the water recycled to the system.

Other methods are known which involve providing a circulation system for leaching contaminants from a vadose layer, the area directly above the water table in the earth, into the water table where they are recovered by a water removal well and a pump. Examplary of this method is U.S. Pat. No. 4,167,973.

Such water flushing and leaching processes as described above, however, suffer from poor water solubility of most organic contaminants resulting in non-efficient and costly recovery.

Other methods to alleviate soil and/or groundwater contamination employ the creation of a vacuum within a withdrawal well situated in a vadose zone. Air injected into the soil at various points surrounding the withdrawal well urge the flow of contaminants towards the withdrawal well where they are vaporized and thereafter collected in the well by vacuum suction. Examples of this method are described in U.S. Pat. Nos. 4,593,760 and Re.33,102.

A variation of the vacuum method mentioned above is discussed in U.S. Pat. No. 4,730,672 which discloses a method for removing and collecting volatile liquid contaminants from a vadose zone of contaminated ground by an active continuous closed-loop process in which a vacuum source in a perforated conduit in a withdrawal well situated in a contaminated vadose zone creates a reduced pressure zone to cause contaminants contained therein to vaporize and be drawn in to the withdrawal conduit for collection and disposal.

While effective for the removal of some easily volatilized liquid contaminants in the vadose layer, such methods have proved to be of limited value in the removal and disposal of many other common subsurface contaminants. Additionally, such methods are not useful for removal of contaminants situated below the water table in a saturated zone.

Accordingly, there is a need for a process that will rapidly and efficiently decontaminate hydrocarbon contaminated subsurface areas including both areas above and below the water table.

BRIEF DESCRIPTION OF THE DRAWINGS

FIG. 3 is a cross-sectional view of a steam and/or nutrient delivery well useful in the process of this invention.

FIG. 4 is a cross-sectional view of an extraction well useful in the process of this invention.

SUMMARY OF THE INVENTION

Figure 1:
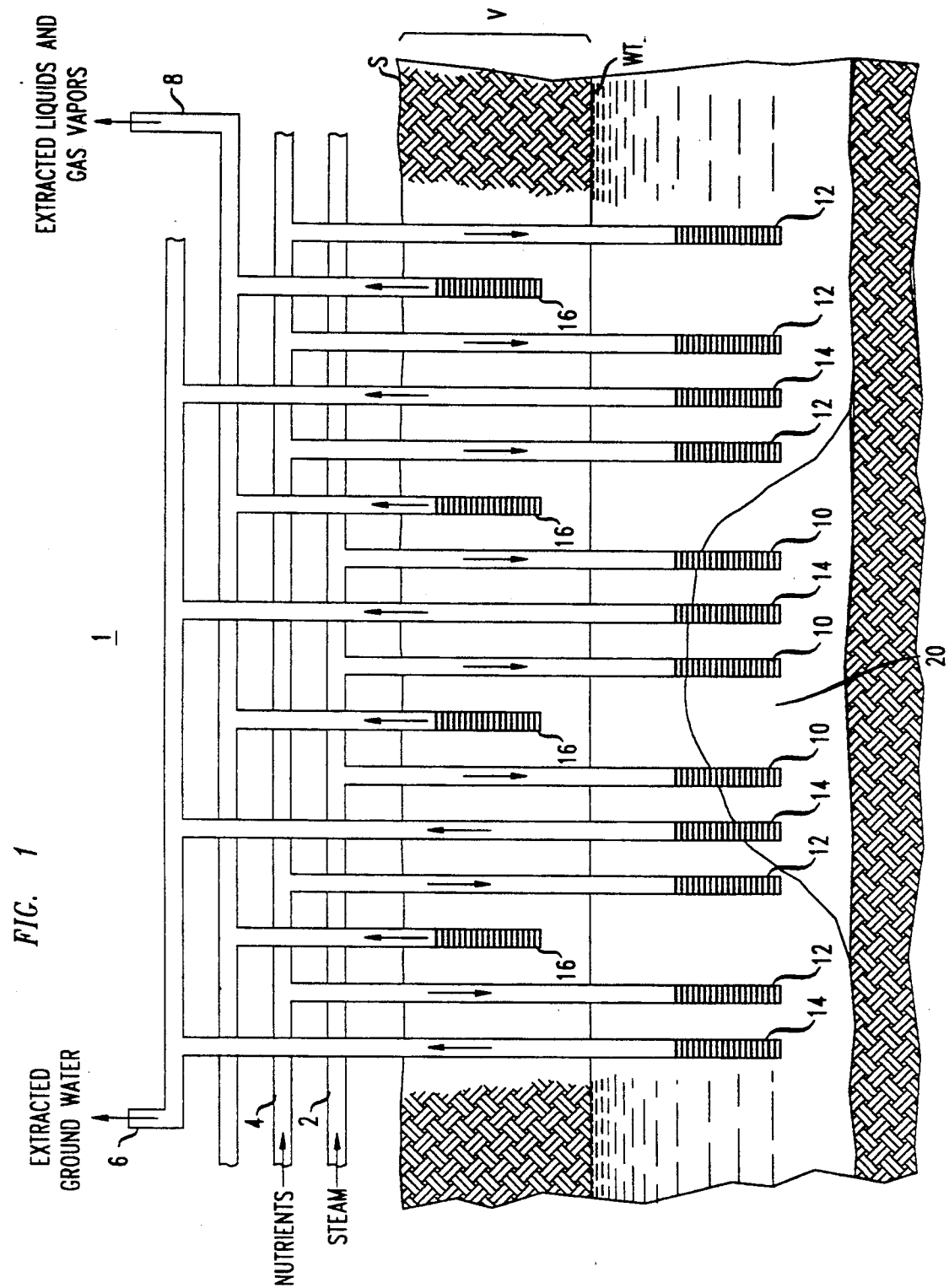
FIG. 1 is a schematic cross-sectional view of an apparatus useful in the present inventive remediation process.

The present inventive process satisfies the above-stated need and provides for the improved removal of contaminants from a contaminated subsurface area of the earth.

In accordance with this invention, there is provided a process for removal of contaminants from a contaminated subsurface area of the earth having a subsurface water table, a subsurface saturated zone below the water table, and a subsurface vadose zone above the water table, and wherein contaminants are present in either or both the saturated zone and the vadose zone, and wherein the process comprises the steps of, (a) establishing at least two injection wells extending downwardly from the surface of the ground, wherein each of said injection wells has a perforate lower portion allowing flow of material therefrom, and wherein said perforate lower portions of said injection wells are disposed in or are proximate to the subsurface saturated zone;

(b) establishing at least one extraction well extending downwardly from the surface of the ground and having a perforate lower portion allowing flow of material thereinto, wherein said perforate lower portion is disposed in or is proximate to the subsurface saturated zone; then (c) introducing steam into at least one of said injection wells whereby steam is caused to flow from said perforate lower portion into said subsurface saturated zone; and (d) simultaneously introducing nutrients effective to enhance the growth of naturally and/or non-naturally occurring hydrocarbon degrading biota present in said subsurface contaminated area into at least one of said injection wells, whereby said nutrients are caused to flow from said lower perforate portion of said injection well into said saturated zone to effect enhanced biodegradation and/or biotransformation of at least a portion of the contaminants present; and (e) applying a withdrawing force to the extraction well, whereby said introduced steam is caused to be drawn through the contaminated subsurface area to cause at least a portion of said contaminants in said subsurface saturated zone to be displaced toward the perforate lower portion of said extraction well, in liquid or vaporized form or in a combination thereof, whereby said contaminants are withdrawn through said extraction well and removed from said contaminated subsurface area for further treatment and/or disposal.

In a preferred embodiment of the present invention, a process is provided for the removal of contaminants from a contaminated subsurface area of the earth having a subsurface water table, a subsurface saturated zone below the water table and a subsurface vadose zone above the water table, and wherein contaminants are present in either or both the saturated zone and the vadose zone, and wherein the process comprises the steps of, (a) establishing at least two injection wells extending downwardly from the surface of the ground, wherein each of said injection wells has a perforate lower portion allowing flow of material therefrom, and wherein said perforate lower portions of said injection wells are disposed in or are proximate to the subsurface saturated zone;

(b) establishing at least two extraction wells extending downwardly from the surface of the ground wherein each of the extraction wells has a perforate lower portion allowing flow of material thereinto, and wherein the perforate lower portion of one of the extraction wells is disposed in or is proximate to the subsurface saturated zone and the perforate lower portion of the other of the extraction wells is disposed in or is proximate to the subsurface vadose zone; then (c) introducing steam into at least one of said injection wells whereby steam is caused to flow from said perforate lower portion into the subsurface saturated zone; while (d) simultaneously introducing nutrients into the other of said injection wells wherein the nutrients are effective to enhance the growth of naturally and/or non-naturally occurring hydrocarbon degrading biota present in said subsurface contaminated area and whereby the nutrients are caused to flow from the lower perforate portion of the injection well into the saturated zone to effect the enhanced biodegradation and/or biotransformation of at least a portion of the contaminants present; while (e) applying a withdrawing force to the extraction wells, whereby introduced steam is caused to be drawn through the contaminated area to cause at least a portion of the contaminants present in the subsurface saturated zone and/or the vadose zone to be displaced toward the perforate lower portions of one or both of the two extraction wells, in liquid or vaporized form or in a combination thereof, whereby said contaminants are withdrawn from the contaminated subsurface area by one or both of said extraction wells for further treatment and/or disposal.

The present invention is more fully described in the following detailed description with reference to illustrative preferred embodiments.

DETAILED DESCRIPTION OF THE INVENTION

The present invention is useful for the removal of contaminants from a contaminated subsurface area of the earth and is especially useful for removing non-naturally occurring hydrocarbon contaminants therefrom.

By use of the phrase "non-naturally occurring hydrocarbon contaminants", this invention contemplates the removal of such hydrocarbons that are commonly found in petroleum such as aromatics, alkanes, olefins and heterocyclic compounds, and various derivatives of these compounds, such as alcohols, esters, ketones, carbonates, acids, and other halogenated derivatives. Especially contemplated for removal are halogenated aliphatic compounds such as trichloroethylene and 1,1,1-trichloroethane, which are typically employed as dry cleaning and industrial degreasing solvents.

Contaminated subsurface areas contemplated for cleanup and decontamination in accordance with this invention are areas having a subsurface water table, a subsurface saturated zone which is below the water table, and a subsurface vadose zone which is situated above the water table and extends to surface of the ground. As is well known, a capillary or capillary fringe zone in which contaminants exist in both liquid and vapor form, usually is located directly above a subsurface water table. The capillary zone can be defined as a form of transition region from the subsurface water table to the vadose zone. For purposes of the present invention, however, this zone is contemplated as being an extension or portion of the water table.

To effect the removal of hydrocarbon contaminants from a contaminated subsurface area in accordance with this invention a system of wells is put in place which are disposed within, around or otherwise in close proximity to an area suspected of contamination. Wells of conventional design are contemplated for use in this invention, which are able to introduce steam and other materials, i.e., nutrients and/or hydrocarbon degrading biota, to a contaminated area of subsurface earth, including both saturated and unsaturated zones, i.e., a vadose zone. At least two injection wells are contemplated, including one for introducing steam, and one for introducing nutrients essential for and effective to enhance the growth of naturally occurring hydrocarbon degrading biota which is present in the contaminated area, and/or for introducing non-naturally occurring hydrocarbon degrading biota and nutrients therefor, if required. The injection wells are constructed of a fluid impermeable conduit material disposed in boreholes, and have perforate lower portions preferably disposed in a subsurface saturated zone, i.e., below the water table, and which allows for injected steam and nutrients (or non-naturally occurring biota and nutrients as required) to be introduced below ground level and into the saturated zone. It is also contemplated in this invention that in addition to or in place of the saturated zone injecting wells one or more of the aforesaid injection wells have their perforate lower portions disposed in a vadose zone to allow for injected steam and other materials (i.e., nutrients for naturally occurring hydrocarbon degrading biota, and/or non-naturally occurring hydrocarbon degrading biota and nutrients therefor as the case may be), to be introduced into the vadose zone in accordance with this invention. Preferably, there are a multiplicity of such steam and nutrient injection wells, the number of each which may depend upon such factors as the size and subsurface geology of the specific contaminated area to be treated, and the specific nature of the contamination.

Disposed among the injection wells is at least one return or extraction well, which is also of conventional design, and constructed of impermeable conduit material disposed in a borehole and having a perforate lower portion disposed in a subsurface saturated zone which allows for the withdrawal of contaminant-bearing groundwater and vapor from the saturated zone to the surface for treatment and removal of the contaminants. There are preferably a multiplicity of such extraction wells located among and spaced apart from the aforesaid injection wells, to form an array or pattern of injection and extraction wells.

In a preferred embodiment, one or more additional relatively shallow extraction wells are present and disposed among the injection and saturated zone extraction wells or are substituted in place therefor, and which have their perforate lower portions disposed in the vadose zone allowing for the withdrawal of vaporized contaminants and liquids therefrom.

By application of a withdrawing force, e.g., by the mechanical action of a pump or by subatmospheric pressure applied by a vacuum pump, to the extraction wells, and in tandum with the simultaneous injection of steam and nutrients, gases and fluids including contaminated material in various physical states are caused to be displaced from their location in the saturated zone and/or vadose zone toward one or both of the perforate lower sections of the extraction wells. Such gases and liquids are then withdrawn through the perforate portions and up the extraction wells to the surface for treatment and/or disposal, to effect decontamination of target subsurface areas of the earth.

In accordance with this invention, the application of steam via one or more injection wells effects the vaporization of subsurface non-volatilized contaminants to facilitate their removal by the applied withdrawing force of the extraction wells in areas near or contiguous to these injection wells. Especially targeted are pools or concentrations of non-dissolved liquid contaminants. Depending on the particular subsurface geology subject to steam application and extraction including such factors as mineral makeup and porosity, the applied steam and volatilized compounds and liquids (e.g. non-volatilized contaminants) are caused to move in various directions through the subsurface area toward the lower perforate portion of the extraction wells in either or both the saturated zone and the vadose zone, as the case may be, for their eventual removal to the surface. Liquids and otherwise non-volatilized material is mobilized and driven by the injected steam toward the perforate portion of the extraction wells.

Also in accordance with this invention, the injection of steam into the subsurface saturated zone and/or vadose zone is accompanied by the simultaneous injection, also into either of the saturated or vadose zones, of nutrients effective for enhancing the growth of naturally occurring hydrocarbon degrading biota present in the contaminated area. It has been found that oftentimes contaminating solvents are present in a contaminated area in an undissolved state, thus rendering their removal from a contaminated subsurface area, particularly from a saturated zone, difficult. By enhancing the growth rate of naturally occurring hydrocarbon degrading biota by such nutrient injection, the enhanced biodegradation and/or biotransformation of some contaminating compounds or solvents to more water soluble and/or more volatile species is readily effected, thereby greatly facilitating their removal via groundwater and/or vapor extraction wells. For example, the biotransformation of trichlorinated solvents results in dichlorinated ethenes and ethanes which are more water soluble, and hence more easily extracted via ground water extraction from the subsurface saturated zone.

Native bacteria capable of biodegrading and/or biotransforming organic compounds (and inorganic compounds) are well known, and are discussed in detail, for example, in U.S. Pat. No. 4,765,902. Nutrients added to the contaminated zone in accordance with this invention and which are essential for the growth of such microbes are also well known, and include, for example, alkali metal phosphates, such as sodium hexametaphosphate and a nitrogen source such as nitrates and ammonium compounds. Preferably, the nutrient system employed comprises at least mineral and primary substrate nutrients, wherein mineral media comprises phosphorous in the form of sodium hexametaphosphate, and nitrogen in the form of ammonium chloride, and which also preferably contains trace quantities of nickel and cobalt salts. The primary substrate is preferably potassium acetate and/or potassium formate. Of course, the introduction of non-naturally occurring hydrocarbon degrading biota and growth enhancing nutrients therefor via injection wells to supplement or complement the action of naturally occurring hydrocarbon degrading biota, or to simply introduce hydrocarbon degrading biota which may not be present at a contaminated site is also contemplated in this invention. Such non-native hydrocarbon degrading biota and nutrients are also well known, and are discussed, for example, in U.S. Pat. No. 4,765,902.

It will also be appreciated by those persons skilled in the relevant art that the simultaneous injection of steam with resulting volatilization and/or mobilization of organic compounds and their subsequent removal from a contaminated subsurface area also has the effect of lowering the concentration of such organic contaminants to levels which are less toxic to indigenous hydrocarbon degrading biota (and/or added non-native biota such as the case may be), or at least eliminates some specific compounds which are toxic to ground water bacteria, to further enhance or accelerate the growth rate of such biota. This effect thus in turn enhances the insitu biotransformation and/or biodegradation of organic contaminants to more water soluble and/or more volatile analogs, and thus greatly facilitating their removal by extraction of contaminated groundwater and vaporized subsurface material.

A preferred embodiment of this invention is best presented an understood with reference to FIGS. 1-5, and the following discussion thereof. It is to be understood, however, that such discussion is for illustrative purposes only and/or merely sets forth some preferred embodiments of this invention of which many other embodiments and variations thereof will be readily apparent to those persons skilled in the relevant art, and are not intended to limit the scope of this invention or the claims or the spirit thereof in any way.

Referring now to FIG. 1 of the drawings, there is depicted a single-field decontamination process, which is designated by reference numeral 1. Reference numerals 2 and 4 refer to supply headers for steam and nutrient injection, respectively. Reference numerals 6 and 8 refer to extraction or return headers for removal of extracted ground water and extracted gas vapors and liquids, respectively. As shown in this preferred embodiment, the headers extend horizontally across the surface of the ground, below which substantially lies the subsurface contaminated area to be treated. The surface of ground is designated as S, and the vadose zone extending from just below the surface of the ground to the water table WT, is designated as V, and the saturated zone is the area below the water table. As also shown in FIG. 1 a non-aqueous liquid phase comprising liquid contaminant in an undissolved state occupies a portion of the contaminated area of the saturated zone below the water table.

A plurality of spaced apart vertical risers situated in boreholes extending downward into the saturated zone below the water table for delivery of injected steam and nutrients into a suspected contaminated subsurface area in the saturated zone are shown by reference numerals 10 and 12, respectively. A portion of the bottoms of risers 10 and 12 are perforated or are fitted with screens to permit injected steam and nutrients to discharge therefrom into the subsurface area in the water table to be decontaminated. The upper ends of risers 10 and 12 are integral with respective supply headers 2 and 4. In this preferred embodiment, the steam and nutrient supply headers, 2 and 4, are shown connected to respective risers 10 and 12 at locations above the surface of the ground, although such construction is not necessary as the entire apparatus may be situated below ground. Additionally, it is contemplated that in other embodiments the risers can extend downward into contaminated ground area in an angular fashion relative to surface of the ground, or can extend into the ground in a horizontal fashion if desired. As also indicated in this embodiment, the perforated portions of steam injection risers 10 preferably extend into an area of undissolved liquid contaminant, or a non-aqueous liquid phase, which occupies a portion of the water table subsurface area to be decontaminated. Such a non-aqueous liquid phase is oftentimes contained in a substantially well defined area, for example, when the subsurface saturated zone borders on a layer of clay or densely packed gravel, or some other substantially impermeably fill material. The present invention, however, also contemplates the injection of steam via perforated riser bottoms into contaminated subsurface areas which lack a non-aqueous liquid phase or which due to particular subsurface geology lack a well defined non-aqueous liquid phase zone, wherein undissolved contaminating liquid hydrocarbons, if any, are dispersed throughout a greater portion of the subsurface contaminated area and, for example, are trapped within pore spaces or between subsurface strata.

A further plurality of spaced apart vertical extraction or return risers situated in boreholes and extending downward into the saturated zone below the water table for the extraction of contaminant-bearing groundwater and vapors are shown by reference numerals 14. A bottom portion of extraction or return risers 14 extending into the subsurface saturated zone are perforated or are fitted with screens to permit the induced flow of contaminated groundwater and vapor thereinto and for removal to integral return header 6 for further treatment such as air stripping and distillation and/or otherwise separation of contaminants, discussed more fully in detail below. Again, in this preferred embodiment, the return header 6 is shown connected to return risers 14 at above-ground surface locations, although such construction is not critical to this invention, as the entire apparatus may be situated below ground level. Further, the extraction risers can also extend downward into the ground in an angular fashion relative to the surface of the ground, or can extend into the ground in a horizontal fashion, as desired.

In the preferred embodiment shown, an additional plurality of spaced apart vertical extraction or return rises situated in boreholes and extending downward into the vadose zone above the water table (and capillary fringe zone) for the extraction of vapors and liquids therefrom are shown by reference numeral 16. A bottom portion of extraction or return risers 16 extending into the vadose zone are perforated or are fitted with screens, or are of some other permeable design to permit the induced flow of vaporized material and liquids thereinto, for their subsequent removal to integral return header 8 for further treatment.

Return headers 6 and 8 for extraction of contaminant-bearing groundwater and vapors from the saturated zone and for extraction of gas vapors and liquids from the vadose zone are connected to a suitable device for maintaining a withdrawing force in the return headers 6 and 8 and return risers 14 and 16, e.g., a pump or pump assembly or a vacuum pump for maintaining a vacuum or subatmospheric pressure, for withdrawing the contaminant-bearing groundwater and vaporized contaminants into the perforated portions of return risers 14 and 16, and thence to the surface for treatment and or disposal. It is also contemplated in this invention, that depending on the depth of return risers, an additional withdrawing force, e.g. subatmospheric pressure, may be applied by one or more pumps installed at a subsurface portion in the saturated zone or vadose zone, such as at the bottoms of respective risers 14 and 16.

Figure 2:
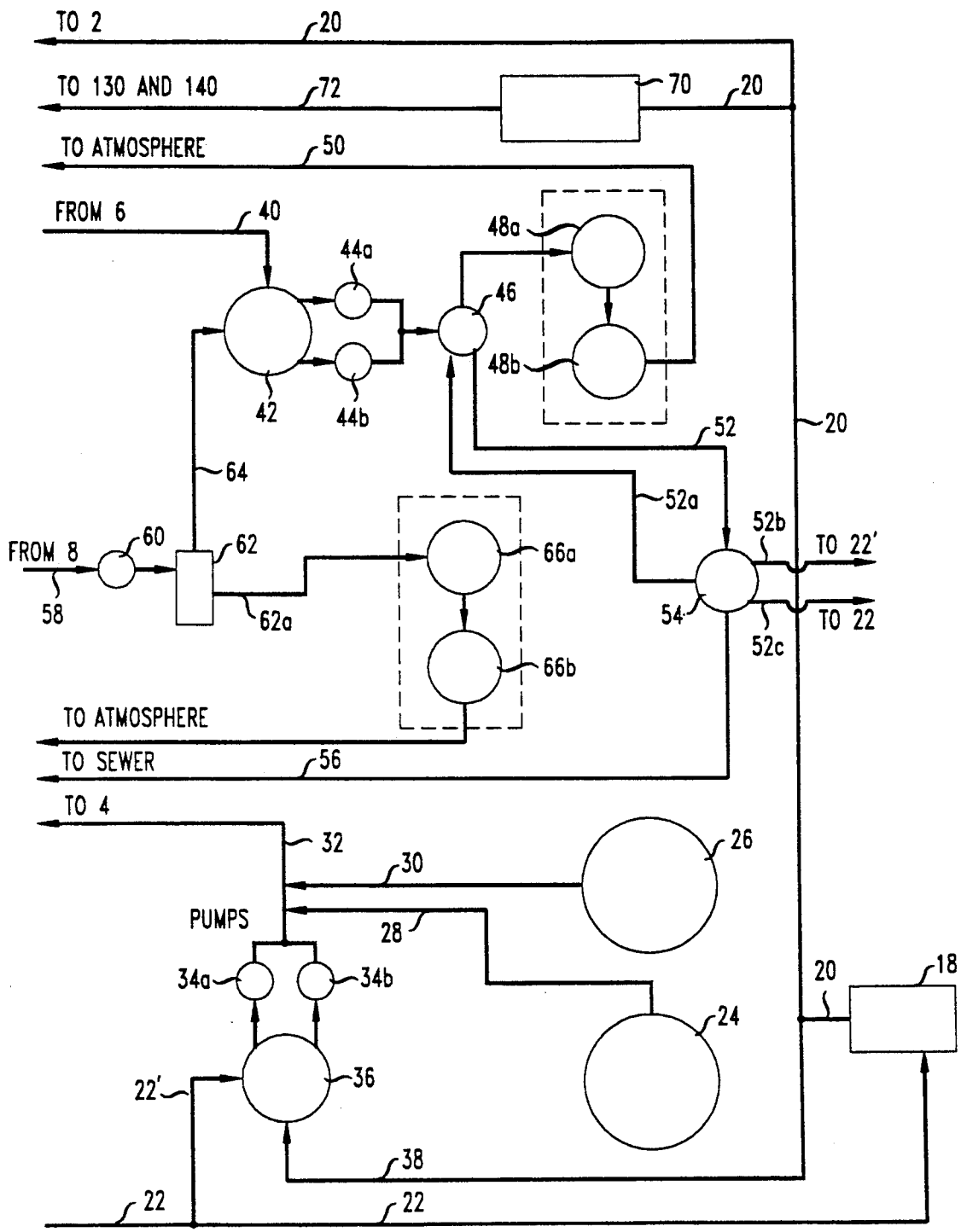
FIG. 2 is a schematic diagram of additional components useful in the apparatus of FIG. 1.

Referring now to FIG. 2, there is shown a schematic of a preferred embodiment of various components of the present inventive treatment system to operate the array of injection and return wells of FIG. 1, and to treat extracted contaminated groundwater and vaporized contaminants.

In FIG. 2 steam is supplied to the injection wells (e.g. header 2 and risers 10 shown in FIG. 1) by a steam generator 18 feeding into a conduit steam line 20. The steam generator 18, as shown, can be fed by a city water supply line 22.

Nutrients to be introduced into their respective injection wells are shown stored in this embodiment in mineral media storage tank 24 and primary substrate storage tank 26, both feeding via lines 28 and 30, respectively, into injection line 32 (e.g., supplying nutrients header 4 and risers 12 in FIG. 1). Nutrients from tanks 24 and 26 are metered into feed line 32 by appropriate metering devices (not shown). One or more injection pumps 34a and 34b also introduce a desired amount of water from deaerating tank 36 into feed line 32. An in-line mixer (not shown) mixes the nutrients and water in line 32 prior to introduction of the resulting mixture or solution into the nutrient injection wells. As also shown in this preferred embodiment, a feed line 38 tapped into steam line 20 supplies steam heat to deaearator 36 to drive off oxygen present in the water supply to be mixed with the injected nutrients, as naturally occurring anaerobic bacteria are contemplated in this preferred embodiment. Of course, in the event aerobic bacteria are employed, the introduction of oxygen or the otherwise maintenance of an appropriate growth environment therefor is contemplated.

Groundwater-containing extracted contaminants, (e.g., received from header 6 in FIG. 1), enters the system via line 40 and equalization tank 42, e.g., via groundwater extraction pumps or vacuum pumps (not shown), and one or more air stripper pumps 44a and 44b to an air striper tower 46. The equalization tank 42 provides for an equalized flow through the air stripper 46. Separated vapors are preferably routed through one or more carbon adsorption beds 48a and 48b, prior to venting to the atmosphere via line 50. Separated and decontaminated groundwater from stripper tower 46 is routed via line 52 to return water surge tank 54, which, if desired, recirculates the water back to the air stripper 46 via line 52a for additional treatment and/or discharge to a municipal water treatment source via line 56 or for reuse thereof for nutrient and/or steam feed as shown generally via lines 52b and 52c.

Effluent (vapor and liquid material) received from the vapor extraction wells (e.g., received from header 8 in FIG. 1), enters the system via line 58 by means of vapor extraction pump 60, and condenser 62. Condensed liquid leaves the condenser 62 via line 64, and enters equalization tank 42 for processing as discussed above. Vapor from condenser 62 is preferably routed via line 62a through one or more carbon adsorption beds 66a and 66b before being vented to the atmosphere via line 68. Additionally, in this preferred embodiment, hot air from the heat exchanger 70 which is heated from steam line 20 is then transferred via line 72 to hot air intake wells situated in the vadose zone as more fully explained in FIGS. 3 and 4 below.

In FIGS. 3 and 4, there are shown respective cross-sectional views of preferred embodiments of steam and/or nutrient injection and extraction wells. Referring now to FIGS. 3 and 4, boreholes 100 and 102, respectively, are shown having respective risers 104 and 106 coaxially situated in each. The risers can be constructed of any impermeable material, for example, galvanized steel. In FIG. 3, feed line 108 supplies riser 104 with steam and/or nutrients received from header 110 (e.g., headers 2 and 4 in FIG. 1). In FIG. 4, suction hose 112 services extraction riser 106 and is connected to return header 114 (e.g. groundwater and vapor extraction or return headers 6 and 8 in FIG. 1). In these preferred embodiments, each of the respective annular areas 116 and 118 between the borehole walls 100 and 102 and injection and extraction risers 104 and 106 in FIGS. 3 and 4 are preferably packed with a loose, fluid permeable material for support of the risers 104 and 106, such as gravel, sand or crushed rock.

At the upper ends of the boreholes 100 and 102 breaching the surface of the ground S, portions of the respective annular areas 116 and 118 extending from the surface of the ground S downward are filled with a low permeability material, 120 and 122, in FIGS. 3 and 4, respectively, such as cement, grout, clay or compacted soil, to prevent air from being drawn from the earth's surface into either of risers 104 and 106.

At the bottom end of each of the risers 104 and 106 extending into their respective boreholes 100 and 102 into a subsurface saturated area of earth to be treated in accordance with this invention, are perforations or screens 124 and 132. In FIG. 3, steam and/or nutrients introduced through riser 104 flows through screen 124 into the annulus area 116, and thereafter into a target area of the subsurface earth to be treated. In this preferred embodiment the size of the perforated or screened portions of the injection riser 104 are designed to avoid the potential preferential migration of steam and/or nutrients through the vadose zone, and to insure that a substantial amount of the injected material remains in the saturated zone for a time sufficient to volatilize and/or mobilize target contaminants, and/or to enhance the growth of biodegrading and/or biotransforming biota and thus hasten biodegradation and/or biotransformation of certain of the contaminants, such as the case may be. This is preferably accomplished by short screening the risers, e.g. by employing screens approximately 1 foot in length depending on subsurface geology, to better localize injected material in a targeted subsurface area. In this preferred embodiment, the annulus area 116 surrounding the screened portion 124 of riser 104 is filled with a filter material 126, e.g., a fine loose fill material such as sand and the like, to prevent clogging or otherwise obstruction of the screened portion of the riser. As shown in FIG. 3, a portion of the annulus area 116 directly above the filter material 126 is also packed with a low permeability material 128, such as clay, i.e., bentonite, to insure that a pressure drop is formed between the surface S and the screen area 124 of injection riser 104.

In this preferred embodiment, the steam/nutrient delivery well design of FIG. 3 also includes a hot air introduction riser 130 with perforated or screened end 130a, shown in this embodiment extending from the surface of the ground through the low permeability cap 130 into annulus area 116. The length (or depth) of hot air riser 130 preferably extends only into the vadose zone, to allow hot air, for example, as generated as waste heat, to exit therefrom to flow through the annulus area 116 and into the vadose zone to maintain a subsurface earth temperature sufficient to prevent the condensation of contaminants vaporized below, e.g., below the water table in a saturated zone by steam injection, and to facilitate their removal by the vapor extraction wells in the vadose zone.

The preferred embodiment of the extraction well design of FIG. 4 is intended for use in both the groundwater vapor extraction wells situated in a saturated zone below the water table and in vapor/liquid extraction wells situated in the vadose zone. Extracted material(s) enter the annulus area 118 from contiguous or surrounding areas of the contaminated subsurface earth, and are thereafter drawn into extraction riser 106 through perforated portion or screen 132 situated at the bottom end of the riser 106 under the influence of an applied withdrawing force, such as subatmospheric pressure applied via a vacuum pump, to extraction header 114 as discussed above. As in the injection well design, the annulus area 118 surrounding the bottom screened portion 132 of the riser 106 is preferably filled with some sort of filter material 134, such as sand, to prevent clogging or obstruction of the screened intake bottom portion of the riser 106. As also depicted in the injection well design of FIG. 3, preferably a portion of the annulus area 118 directly above the filter material 134 is also packed with low permeability material 136, e.g., bentonite, to insure the maintenance of a desired pressure drop between the surface S and the subsurface area of the earth undergoing extraction.

Additionally, as shown in the preferred embodiment, the extraction well shown in FIG. 4 is fitted with a second vapor extraction riser 140 extending into the vadose zone to allow vaporized material being drawn into the annulus area 118 under the influence of the applied subatmospheric pressure withdrawing force, e.g. subatmospheric pressure to be removed thereby.

Figure 5:
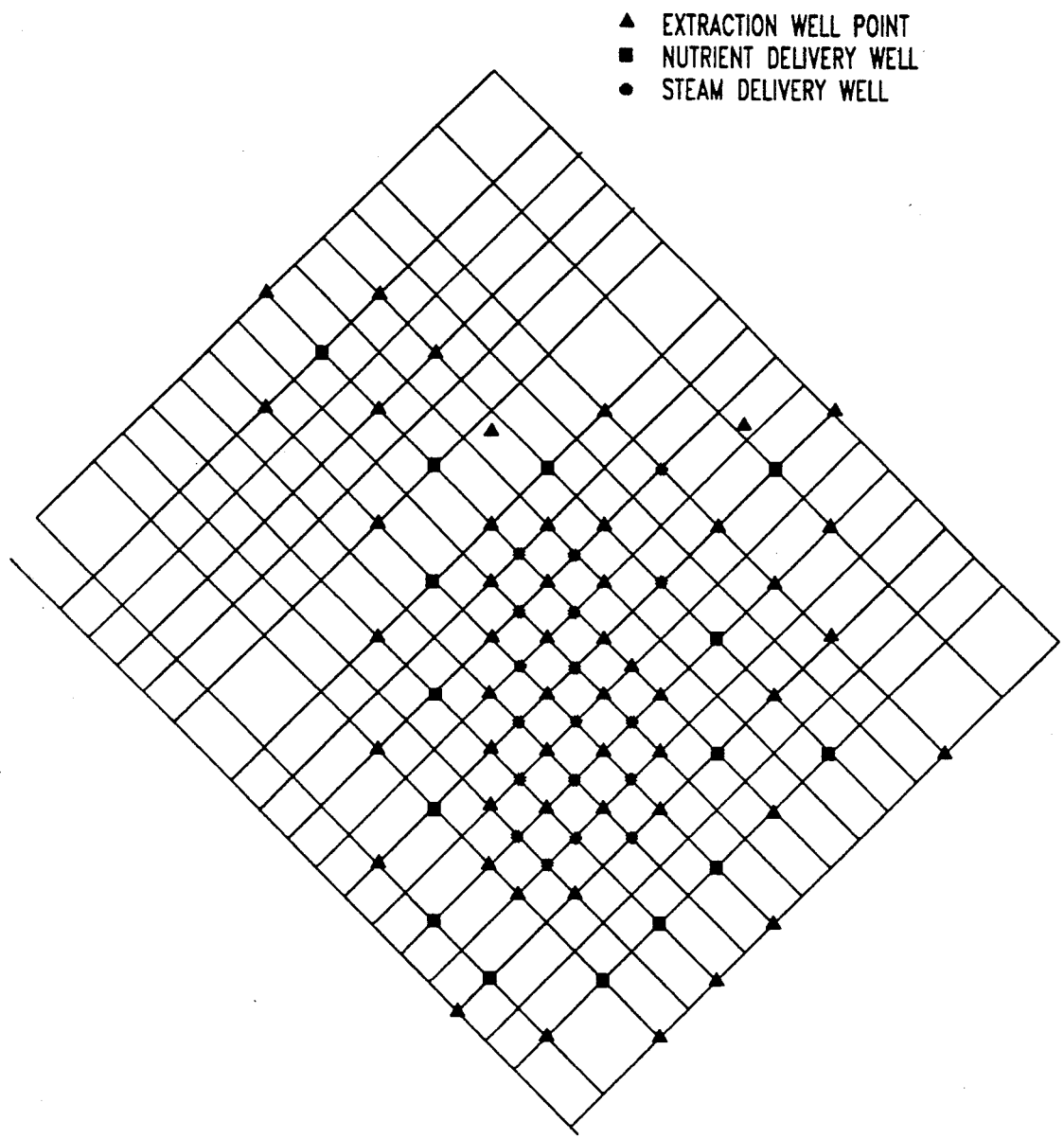
FIG. 5 shows an exemplary array of steam and nutrient injection wells and extraction wells in accordance with this invention in plan view.

Referring now to FIG. 5, there is shown a typical array of spaced apart steam and nutrient injection wells interdispersed with an array of spaced apart extraction wells. While not specifically indicated, the extraction wells are intended to illustrate both extraction wells situated in the saturated zone and vadose zone. The spacing of each of the injection and nutrient wells is determined by such factors as the nature and extent of the contamination, and by the particular nature of the subsurface geology to be decontaminated.

We claim:

1. A process for removal of contaminants from a contaminated subsurface area of the earth having a subsurface water table, a subsurface saturated zone below the water table, and a subsurface vadose zone above the water table, and wherein contaminants are present in either or both the saturated zone and the vadose zone, and wherein the process comprises the steps of:
    (a) establishing at least two injection wells, wherein each of said injection wells has a perforate portion allowing flow of material therefrom, and wherein said perforate portions of said injection wells are disposed in or are proximate to the subsurface saturated zone;
    (b) establishing at least one extraction well having a perforate portion for allowing flow of material thereinto, wherein said perforate portion is disposed in or is proximate to the subsurface saturated zone;
    (c) introducing steam into at least one of said injection wells, whereby steam is caused to flow from said perforate portion into said subsurface saturated zone, and, simultaneously with the introduction of steam, introducing into another one of said injection wells nutrients effective to enhance the growth of naturally occurring hydrocarbon degrading biota present in said subsurface contaminated area and/or non-naturally occurring hydrocarbon degrading biota and nutrients effective to enhance the growth thereof, whereby said nutrients and/or said non-naturally occurring biota and nutrients are caused to flow from said perforate portion of said injection well into said saturated zone to effect enhanced biodegradation and/or biotransformation of at least a portion of the contaminants present; and
    (d) applying a withdrawing force to said at least one extraction well, whereby at least a portion of said contaminants present in said subsurface saturated zone is displaced toward the perforate portion of said at least one extraction well, in liquid or vaporized form or in a combination thereof, and whereby said contaminants are withdrawn through said at least one extraction well removed from said contaminated subsurface area.

2. The process of claim 1, wherein said contaminants are non-naturally occurring hydrocarbon contaminants.

3. The process of claim 2, wherein said non-naturally occurring hydrocarbon contaminants are selected from the group consisting of alkanes, olefins, aromatics, heterocyclics and derivatives and halogenated derivatives thereof.

4. The process of claim 3, wherein said hydrocarbon contaminants are halogenated aliphatic and aromatic compounds.

5. The process of claim 1, wherein steam and nutrients effective to enhance the growth of naturally occurring hydrocarbon degrading biota and/or non-naturally occurring hydrocarbon degrading biota and nutrients effective to enhance the growth thereof are simultaneously caused to flow into said saturated zone and/or said vadose zone from a plurality of steam and nutrient and/or hydrocarbon degrading biota injection wells having their perforate portions disposed in or proximate to the subsurface zone and/or the subsurface vadose zone.

6. The process of claim 5, wherein a plurality of extraction wells are established, and wherein each of said extraction wells has a perforate portion allowing flow of material thereinto, and wherein the perforate portions of one or more of the extraction wells is disposed in or is proximate to the subsurface saturated zone and/or the perforate portion of one or more of said extraction wells is disposed in or is proximate to the subsurface vadose zone.

7. A process for the removal of contaminants from a contaminated subsurface area of the earth having a subsurface water table, a subsurface saturated zone below the water table and a subsurface vadose zone above the water table, and wherein contaminants are present in either or both the saturated zone and the vadose zone, and wherein the process comprises the steps of:
    (a) establishing at least two injection wells, wherein each of said injection wells has a perforate portion allowing flow of material therefrom, and wherein said perforate portions of said injection wells are disposed in or are proximate to the subsurface saturated zone;
    (b) establishing at least two extraction wells wherein each of said extraction wells has a perforate portion allowing flow of material thereinto, and wherein the perforate portion of one of the extraction wells is disposed in or is proximate to the subsurface saturated zone, and the perforate portion of the other of the wells is disposed in or is proximate to the subsurface vadose zone; then
    (c) introducing steam into at least one of said injection wells, whereby steam is caused to flow from said perforate portion into the subsurface saturated zone, and, simultaneously with the introduction of steam, introducing into the other one of said injection wells nutrients effective to enhance the growth of naturally occurring hydrocarbon degrading biota present in said subsurface contaminated area and/or non-naturally occurring hydrocarbon degrading biota and growth-enhancing nutrients therefor, whereby said nutrients and/or said non-naturally occurring biota and nutrients therefor are caused to flow from the perforate portion of said injection well into said saturated zone to effect the enhanced biodegradation and/or biotransformation of at least a portion of the contaminants present; while (d) applying a withdrawing force to the extraction wells, whereby at least some of the contaminants present in the subsurface saturated zone and/or the vadose zone are caused to be displaced toward the perforate portions of one or both of said extraction wells, in liquid or vaporized form or in a combination thereof, and are withdrawn through one or both of said extraction wells and removed from the contaminated subsurface saturated zone and/or vadose zone.

8. The process of claim 1 or 7, wherein at least a portion of said contaminants is present in said subsurface area as pools of non-dissolved liquids.

9. The process of claim 8, wherein the remainder of said contaminants is dispersed throughout the remainder of the subsurface contaminated area.

10. The process of claim 1 or 7, wherein said injected nutrients comprise mineral and primary substrate nutrients.

11. The process of claim 10, wherein said injected mineral nutrient comprises sodium hexameta phosphate and/or ammonium chloride, and optionally contains trace quantities of nickel and/or cobalt salts, and said primary substrate nutrient is potassium acetate and/or potassium formate.

12. The process of claim 7, wherein said contaminants are non-naturally occurring hydrocarbon contaminants.

13. The process of claim 12, wherein said non-naturally occurring hydrocarbon contaminants are selected from the group consisting of alkanes, olefins, aromatics, heterocyclics and derivatives and halogenated derivatives thereof.

14. The process of claim 13, wherein said hydrocarbon contaminants are halogenated aliphatic and aromatic compounds.

15. The process of claim 7, wherein steam and nutrients effective to enhance the growth of naturally occurring hydrocarbon degrading biota and/or non-naturally occurring hydrocarbon degrading biota and nutrients effective to enhance the growth thereof are simultaneously caused to flow into said saturated zone and/or said vadose zone from a plurality of steam and nutrient and/or hydrocarbon degrading biota injection wells having their perforate portions disposed in or proximate to the subsurface saturated zone and/or the subsurface vadose zone.

* * * * *